US011597240B2

(12) United States Patent
Ishikawa

(10) Patent No.: US 11,597,240 B2
(45) Date of Patent: Mar. 7, 2023

(54) DECORATIVE BODY

(71) Applicant: BRIDGESTONE CORPORATION, Tokyo (JP)

(72) Inventor: Naoko Ishikawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 223 days.

(21) Appl. No.: 16/772,007

(22) PCT Filed: Dec. 3, 2018

(86) PCT No.: PCT/JP2018/044421
§ 371 (c)(1),
(2) Date: Jun. 11, 2020

(87) PCT Pub. No.: WO2019/116950
PCT Pub. Date: Jun. 20, 2019

(65) Prior Publication Data
US 2021/0086565 A1  Mar. 25, 2021

(30) Foreign Application Priority Data

Dec. 12, 2017 (JP) .............................. JP2017-238077

(51) Int. Cl.
*B60C 13/00* (2006.01)

(52) U.S. Cl.
CPC .................................. *B60C 13/001* (2013.01)

(58) Field of Classification Search
CPC .............................. B60C 13/001; B60C 13/02
See application file for complete search history.

(56) References Cited

U.S. PATENT DOCUMENTS 6,253,815 B1   7/2001 Kemp et al.
2008/0283169 A1  11/2008 Sato et al.
(Continued)

FOREIGN PATENT DOCUMENTS

CN    201092238 Y    7/2008
CN    103660806 A    3/2014
(Continued)

OTHER PUBLICATIONS

Yoshifumi, English Machine Translation of JP 2007091155, 2007 (Year: 2007).*
(Continued)

*Primary Examiner* — Robert C Dye
*Assistant Examiner* — Brendon Charles Darby
(74) *Attorney, Agent, or Firm* — Sughrue Mion, PLLC

(57) ABSTRACT

A decorative body includes a first set through a fourth set that are a first solid shape pair at which initial points of respective vectors of a pair of reflecting pieces that are adjacent to one another are adjacent to one another and the respective vectors face in opposite directions, a second solid shape pair at which terminal points of a pair of respective vector of reflecting pieces that are adjacent to one another are adjacent to one another and the respective vectors face in opposite directions, a first solid shape group that is an aggregate in which three or more reflecting pieces at which the orientations of the vectors face in a same direction are continuous, and a third solid shape pair that is a pair formed from two reflecting pieces that do not belong to any of these.

20 Claims, 13 Drawing Sheets

(56) References Cited

U.S. PATENT DOCUMENTS

| | | |
|---|---|---|
| 2009/0218019 A1 | 9/2009 | Paturle |
| 2013/0000808 A1 | 1/2013 | Ishida |
| 2013/0032265 A1 | 2/2013 | Kouda et al. |
| 2013/0075005 A1 | 3/2013 | Sato |
| 2013/0299056 A1 | 11/2013 | Iwabuchi et al. |

FOREIGN PATENT DOCUMENTS

| | | | |
|---|---|---|---|
| CN | 103921627 A | | 7/2014 |
| JP | 07164831 A | * | 6/1995 |
| JP | 2000-280716 A | | 10/2000 |
| JP | 2001-191745 A | | 7/2001 |
| JP | 2002-522294 A | | 7/2002 |
| JP | 2003-175707 A | | 6/2003 |
| JP | 2007-091155 A | | 4/2007 |
| JP | 2008-189165 A | | 8/2008 |
| JP | 2008-273505 A | | 11/2008 |
| JP | 2009-512584 A | | 3/2009 |
| JP | 2012-101754 A | | 5/2012 |
| JP | 2013-010401 A | | 1/2013 |
| JP | 2013-035313 A | | 2/2013 |
| JP | 2013-071572 A | | 4/2013 |
| JP | 2017-081304 A | | 5/2017 |
| JP | 2017-81305 A | | 5/2017 |
| WO | 2012/032741 A1 | | 3/2012 |

OTHER PUBLICATIONS

Kikuchi, English Machine Translation of JP H07164831, 1995 (Year: 1995).*

Extended European Search Report dated Jul. 29, 2021 by the European Patent Office on application No. 18887850.8.

Search Report dated Sep. 24, 2021 from the China National Intellectual Property Administration in CN Application No. 2018800805308.

International Search Report for PCT/JP2018/044421, dated Feb. 26, 2019.

* cited by examiner

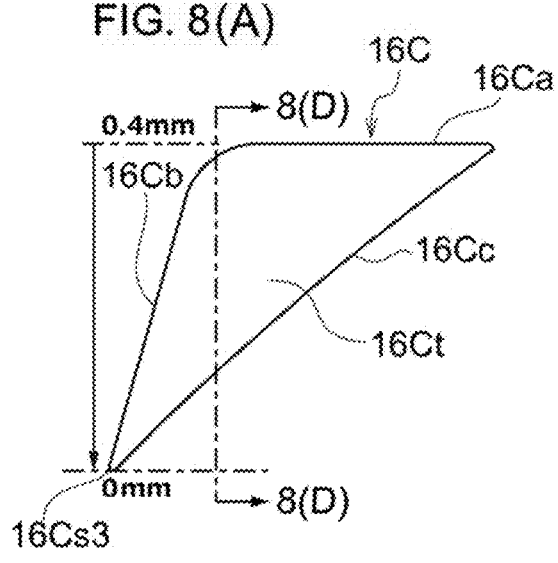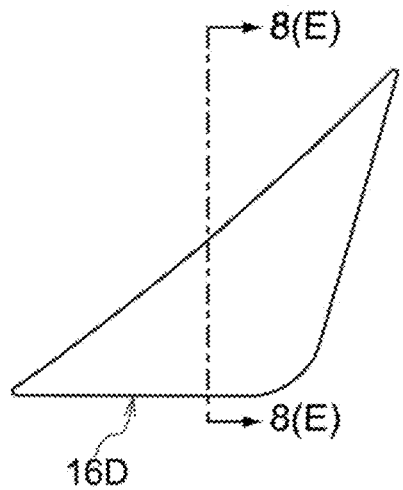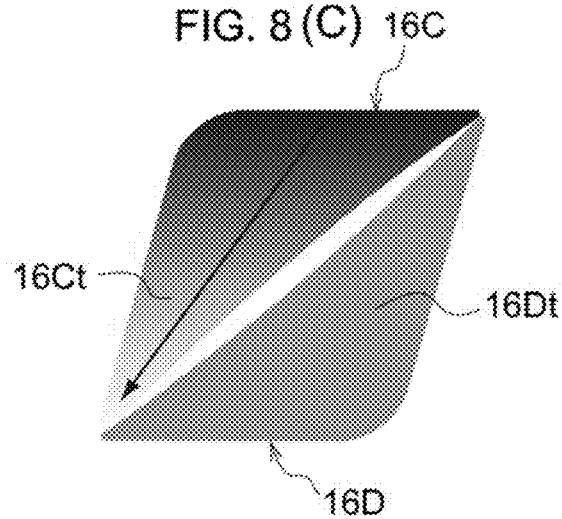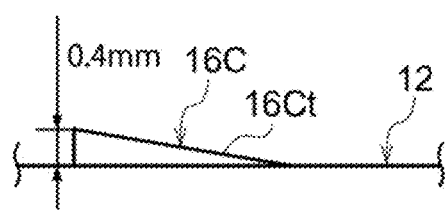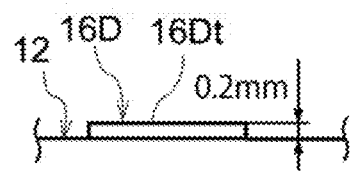

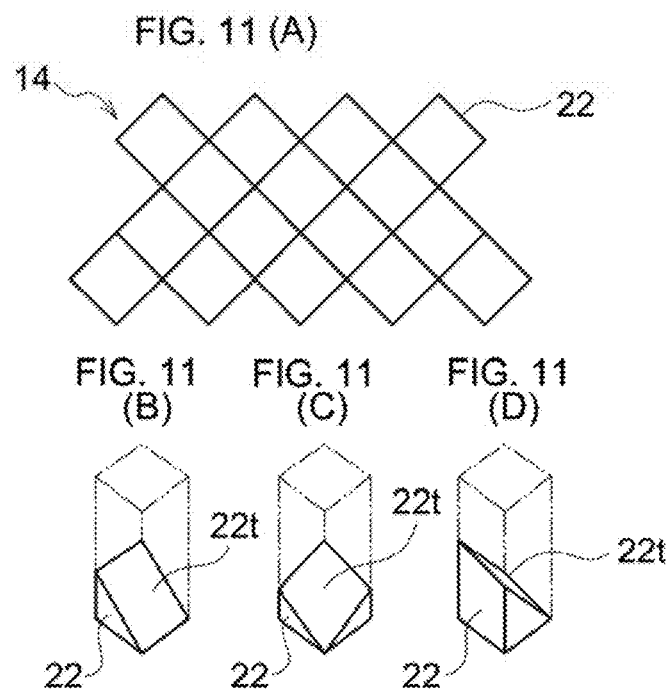
FIG. 11 (A)
FIG. 11 (B)    FIG. 11 (C)    FIG. 11 (D)
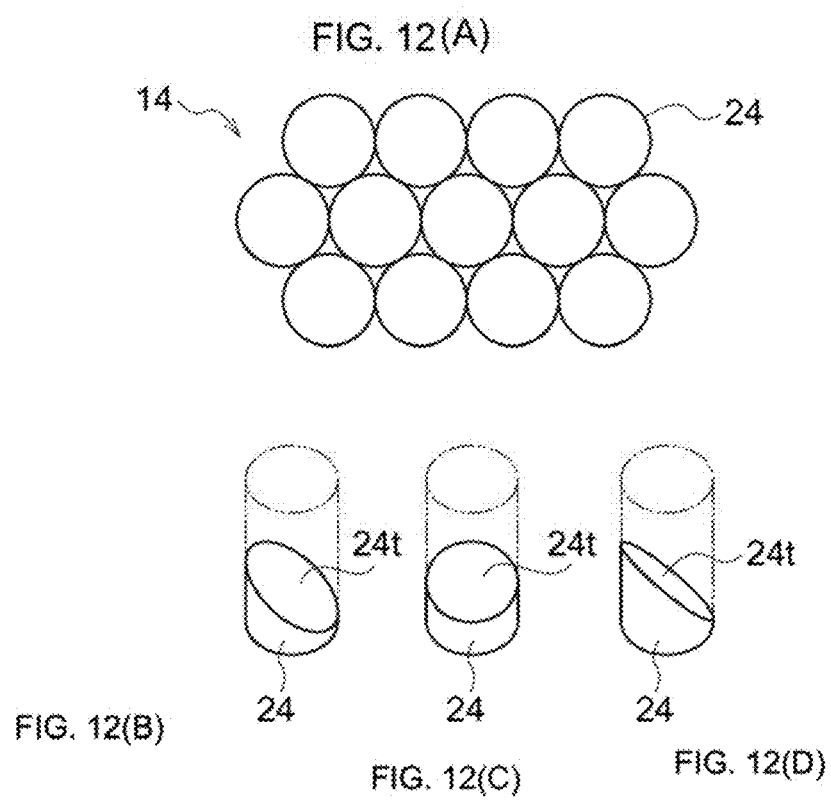
FIG. 12(A)
FIG. 12(B)    FIG. 12(C)    FIG. 12(D)

FIG. 13(A)
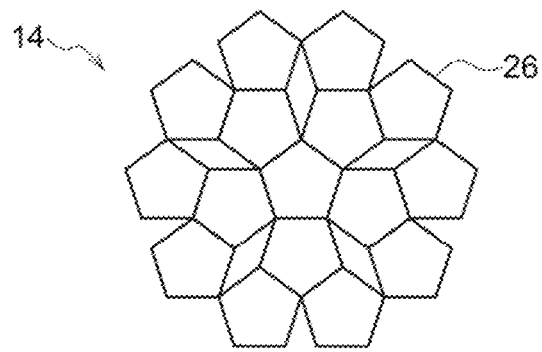
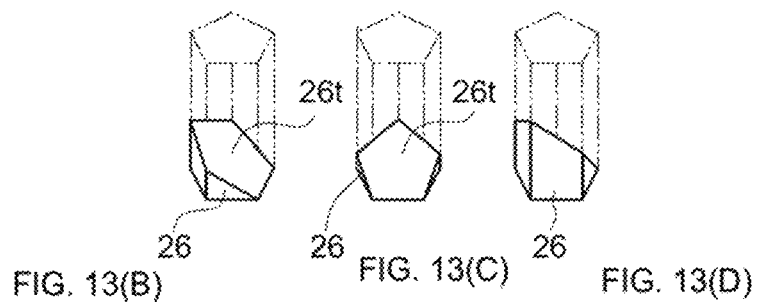
FIG. 13(B)   FIG. 13(C)   FIG. 13(D)
FIG. 14(A)
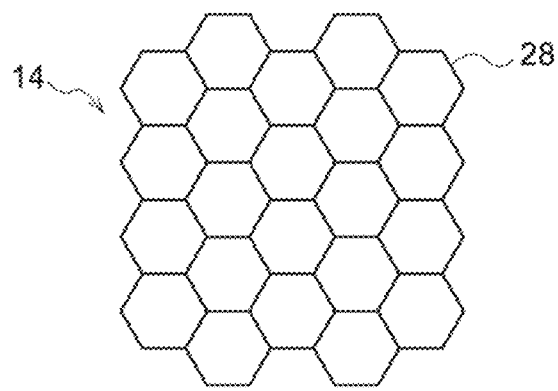
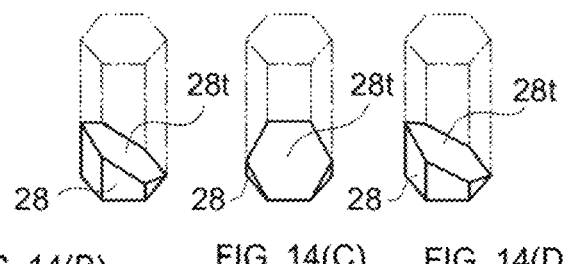
FIG. 14(B)   FIG. 14(C)   FIG. 14(D)

DECORATIVE BODY

CROSS REFERENCE TO RELATED APPLICATIONS

This application is a National Stage of International Application No. PCT/JP2018/044421 filed Dec. 3, 2018, claiming priority based on Japanese Patent Application No. 2017-238077 filed Dec. 12, 2017.

TECHNICAL FIELD

The present disclosure relates to a decorative body that is formed at a tire side portion.

BACKGROUND ART

Tires, at which machining to create surface irregularities for improving visibility is carried out on the tire side portions, are disclosed as tires in Japanese Patent Application Laid-Open (JP-A) No. 2013-71572, JP-A No. 2008-273505, JP-A No. 2008-189165, Japanese Patent Application National Publication No. 2002-522294, and JP-A No. 2012-101754.

SUMMARY OF INVENTION

Technical Problem

In the tire disclosed in JP-A No. 2013-71572, plural pattern elements, which have the same contour shapes that have directivity that is such that the light reflecting characteristics vary continuously or in a stepwise manner in one direction, are disposed in rows in the tire circumferential direction and the tire radial direction. The placement orientation thereof is varied periodically along the tire circumferential direction, and, at pattern elements that are adjacent to one another in the tire radial direction, the placement orientation thereof is made to differ. Due to such an arrangement of pattern elements, at the portion where the pattern elements are located, it appears to the viewer that convex and concave portions arise three-dimensionally, and the convex and concave portions that exist at the outer surfaces of the sidewall portions are made to be hard to notice, but the visibility of the tire itself is not improved.

In the tire disclosed in JP-A No. 2008-273505, convex and concave portions are formed at the outer surfaces of the sidewall portions. Mirror surfaces are provided at the surfaces of at least some of the concave portions, and rough surfaces are provided at the peripheries of these mirror surfaces. Due thereto, changes are imparted to changes in the light reflectivity, and the external appearance of the tire improves, but the visibility of the tire itself is not improved. Further, if dirt gets into the concave portions that have the rough surfaces, it is difficult to remove the dirt.

In the tire disclosed in JP-A No. 2008-189165, decorative bodies, which are annular and are aggregates of many polygonal pyramids, are provided at the sidewall portions. Due thereto, convex and concave portions, such as the spliced ends or turned-over ends or the like of the carcass layer, which appear at the surfaces of the side wall portions, are made to be inconspicuous, but the visibility of the tire itself is not improved.

In the tire disclosed in Japanese Patent Application National Publication No. 2002-522294, by changing the light reflectance at symbol portions and background portions, contrast is created between the symbol portions and the background portions, and the symbols can be identified clearly, but the visibility of the tire itself is not improved.

In the tire disclosed in JP-A No. 2012-101754, by creating the visual effect that a second decorative body portion, which is provided within a first decorative body portion, appears to be emphasized, convex and concave portions that arise at the outer surfaces of the sidewalls are made to be hard to notice, and the decorativeness can be improved. However, the visibility of the tire itself is not improved.

These decorations and the like of the tire side portions are conspicuous when the tire is observed closely. All of these techniques are techniques that make convex and concave portions of the tire side portions inconspicuous, or improve the visibility of symbols and the like, but are not techniques that improve the visibility of the tire.

In view of the above-described circumstances, an object of the present disclosure is to provide a decorative body that can improve the visibility of a tire.

Solution to Problem

A decorative body relating to a first aspect is a decorative body that includes a plurality of solid shapes that, with bottom surfaces thereof being a surface of a tire side portion, have the bottom surface and a plurality of inclined surfaces that are inclined in directions other than a plane that is orthogonal to the bottom surface, wherein, given that a direction heading from a highest region side toward a lowest region side of one of the inclined surfaces, having an angle of inclination with respect to the bottom surface which is smallest of the solid shapes, is defined as a vector of the inclined surfaces, and the highest region side of the vector is defined as an initial point of the vector, and the lowest region side of the vector is defined as an terminal point, a pair of the plurality of solid shapes that are adjacent to one another and at which the initial point of the vector of one solid shape of the pair of solid shapes and the initial point of the vector of another solid shape of the pair of solid shapes are adjacent to one another, and an orientation of the vector of the one solid shape and an orientation of the vector of the other solid shape, when the surface of the tire side portion is seen in plan view, face in directions opposite one another, is defined as a first solid shape pair, a pair of the solid shapes at which the terminal point of the vector of one of the solid shapes that are adjacent to one another and the terminal point of the vector of another of the solid shapes are adjacent to one another, and an orientation of the vector of the one solid shape and an orientation of the vector of the another solid shape, when the surface of the tire side portion is seen in plan view, face in directions opposite one another, is defined as a second solid shape pair, an aggregate of the solid shapes at which three or more of the solid shapes, at which the orientations of the vectors when the surface of the tire side portion is seen in plan view face in the same direction, and at which the orientations of the respective vectors when the solid shapes are seen in a side view face in the same direction, are continuous, is defined as a first solid shape group, a pair formed from two of the solid shapes that do not belong to any of the first solid shape pair, the second solid shape pair and the first solid shape group, is defined as a third solid shape pair, when the surface of the tire side portion is seen in plan view, all conditions including a first condition that satisfies a total surface area of the third solid shape pair>a total surface area of the first solid shape pair, a second condition that satisfies the total surface area of the third solid shape pair>a total surface area of the second solid shape pair, and a third condition that satisfies the total surface area of the third solid shape pair>a total surface area of the first solid shape group, are present.

At the decorative body at which all of these respective conditions are satisfied, at several inclined surfaces that are apart from one another among the plural inclined surfaces, light that is illuminated onto the tire can be reflected, for example, in the direction of an observer at the side of the tire. When at least one of the tire and the observer moves, and the tire and the observer move relatively, the inclined surfaces that reflect light toward the observer change randomly. Due thereto, at the decorative body, light appears to be flickering at plural, different positions, or in other words, the decorative body appears to have a sparkling appearance.

The definition of "sparkling" is described hereinafter.

The effect that, accompanying changes in the viewpoint with respect to an object, changes that are as if the highlighted places (when viewing a uniform range, the places that appear to be the brightest) are flickering can be seen. When viewed in a stationary state, the effect that, accompanying changes in the light source that is illuminated, changes that are as if the highlighted places are changing and flickering can be seen.

In a second aspect, in the decorative body relating to the first aspect, the total surface area of the third solid shape pair>the total surface area of the first solid shape pair+the total surface area of the second solid shape pair+the total surface area of the first solid shape group, is satisfied.

When comparing the first solid shape pair, which is a pair of solid shapes at which the initial point of the vector of one of the solid shapes that are adjacent to one another and the initial point of the vector of the another solid shape are adjacent to one another, and the vector of the one solid shape and the vector of the another solid shape face in directions opposite one another, and the third solid shape pair, the orientations of the vectors appear to be more random at the third solid shape pair.

Further, when comparing the second solid shape pair, which is a pair of solid shapes at which the terminal point of the vector of one of the solid shapes that are adjacent to one another and the terminal point of the vector of the another solid shape are adjacent to one another, and the vector of the one solid shape and the vector of the another solid shape face in directions opposite one another, and the third solid shape pair, the orientations of the vectors appear to be more random at the third solid shape pair.

Moreover, the first solid shape group, which is an aggregate of the solid shapes at which three or more of the solid shapes, at which the orientations of the vectors when the surface of the tire side portion is seen in plan view face in the same direction, and at which the orientations of the respective vectors when the solid shapes are seen in a side view face in the same direction, are continuous, appears as a ridge, i.e., a mountain ridge. When the first solid shape group and the third solid shape pair are compared, the orientations of the vectors appear to be more random at the third solid shape pair.

Accordingly, by making it such that the total surface area of the third solid shape pair>the total surface area of the first solid shape pair+the total surface area of the second solid shape pair+the total surface area of the first solid shape group, the regions where the orientations of the vectors appear to be random increase, and the decorative body can be made to exhibit a more sparkling appearance.

In a third aspect, in the decorative body relating to the first aspect or the second aspect, the solid shapes are disposed such that an amount of change in the orientations of the vectors of the solid shapes that are adjacent to one another, when a plurality of solid shapes are seen in plan view, does not continue over three or more of the solid shapes.

The amounts of change in the orientations of the vectors of solid shapes that are adjacent to one another when the plurality of solid shapes are seen in plan view, are, in other words, an angle that is formed by the orientation of the vector of one of the solid shapes and the orientation of the vector of another solid shape that is adjacent thereto. When comparing a case in which the solid shapes are disposed such that an amount of change in the orientations of the vectors does not continue over three or more of the solid shapes, and a case in which the solid shapes are disposed such that an amount of change in the orientations of the vectors continues over three or more the solid shapes, at the former more so than the latter, it will seem as if the vectors of the solid shapes are disposed randomly, or, in other words, it will seem as if there is no regularity, and the former will exhibit a more sparkling appearance than the latter.

In a fourth aspect, in the decorative body relating to anyone of the first through third aspects, a surface area, which is occupied by the inclined surfaces that have the smallest angles of inclination, per unit surface area when seen in plan view is within a range of 70 to 100%.

At the solid shapes that are disposed at the tire side portion, when the inclined surfaces that have an angle of inclination which is small and the inclined surfaces that have an angle of inclination which is large are compared, the proportion of the peripheral light that is reflected toward the observer at the side of the tire is greater at the inclined surfaces that have the angle of inclination which is small than at the inclined surface that have the angle of inclination which is large.

Accordingly, the surface area that the inclined surfaces, having angles of inclination which are the smallest, occupy per unit surface area of the decorative body when the decorative body is seen in plan view is made to be in a range of 70 to 100%. By doing so, the surface area of the portions that reflect light toward the observer who is positioned in front of the tire is ensured, and the portions that reflect light and that appear to be shining can be seen to be bright by the observer, and the sparkling sensation can be emphasized. Note that, if the surface area that the inclined surfaces, having angles of inclination which are the smallest, occupy per unit surface area of the decorative body is less that 70%, the surface area of the inclined surfaces that reflect light toward the observer who is positioned in front of the tire is small, and the effect of emphasizing the sparkling sensation feels insufficient.

In a fifth aspect, in the decorative body relating to anyone of the first through the fourth aspects, 3 to 200 of the solid shapes are provided per 1 cm$^2$.

At the decorative body, if there is a small number of the solid shapes per unit surface area, the number of portions that appear to be shining is too small, and it is difficult to obtain a sparkling sensation. On the other hand, if the number of solid shapes per unit surface area is too large, the surface area of the portions that appear to be shining is too small, and it is difficult to make the portions that appear to be shining seem bright, and it is difficult to obtain a sparkling sensation. Therefore, in order to reliably make the decorative body exhibit a sparkling appearance, it is preferable that 3 to 200 of the solid shapes be disposed per 1 cm$^2$.

Further, at the solid shape, the shape of the inclined surface, which has the smallest angle of inclination with respect to the bottom surface when seen in plan view, can be made to be triangular.

In a sixth aspect, in the decorative body relating to any one of the first through the fifth aspects, shapes of the inclined surfaces, at which angles of inclination with respect to the bottom surfaces are smallest when the solid shapes are seen in plan view, are triangular.

At the decorative body, light can be reflected by an inclined surface that is triangular.

In a seventh aspect, the decorative body relating to any one of the first through the sixth aspects comprises a second solid shape group that is an aggregate of the plurality of solid shapes that is structured by three or more of the solid shapes, at which orientations of the vectors when the surface of the tire side portion is seen in plan view face in the same direction, and at which orientations of the respective vectors when the solid shapes are seen in a side view face in different directions, being continuous.

The second solid shape group that is an aggregate of three or more continuous solid shapes at which the orientations of the vectors when the surface of the tire side portion is seen in plan view face in the same direction. However, the orientations of the respective vectors when the respective solid shapes are seen in a side view face in different directions. Therefore, as compared with a case in which the orientations of the respective vectors when the respective solid shapes are seen in a side view face in the same direction, the second solid shape group can be made to exhibit a sparkling appearance.

Advantageous Effects of Invention

In accordance with the decorative body of the present disclosure, the decorative body can be made to exhibit a sparkling appearance, and the visibility of the tire can thereby be improved.

BRIEF DESCRIPTION OF DRAWINGS

FIG. 8(A) is plan view showing one reflecting piece of a second set, FIG. 8(B) is plan view showing another reflecting piece of the second set, FIG. 8(C) is plan view showing the second set in which the heights of inclined surfaces of the reflecting pieces are expressed by gradation, FIG. 8(D) is a cross-sectional view of the one reflecting piece of the second set, and FIG. 8(E) is a cross-sectional view of the another reflecting piece of the second set.

FIGS. 11(A) through 11(D) are plan view and perspective views of reflecting cells that structure a decorative body relating to another embodiment.

FIGS. 12(A) through 12(D) are plan view and perspective views of reflecting cells that structure a decorative body relating to yet another embodiment.

FIGS. 13(A) through 13(D) are plan view and perspective views of reflecting cells that structure a decorative body relating to still another embodiment.

FIGS. 14(A) through 14(D) are plan view and perspective views of reflecting cells that structure a decorative body relating to still yet another embodiment.

DESCRIPTION OF EMBODIMENTS

A tire 10 relating to an embodiment in the present invention is described by using FIG. 1 through FIG. 14.

Figure 1:
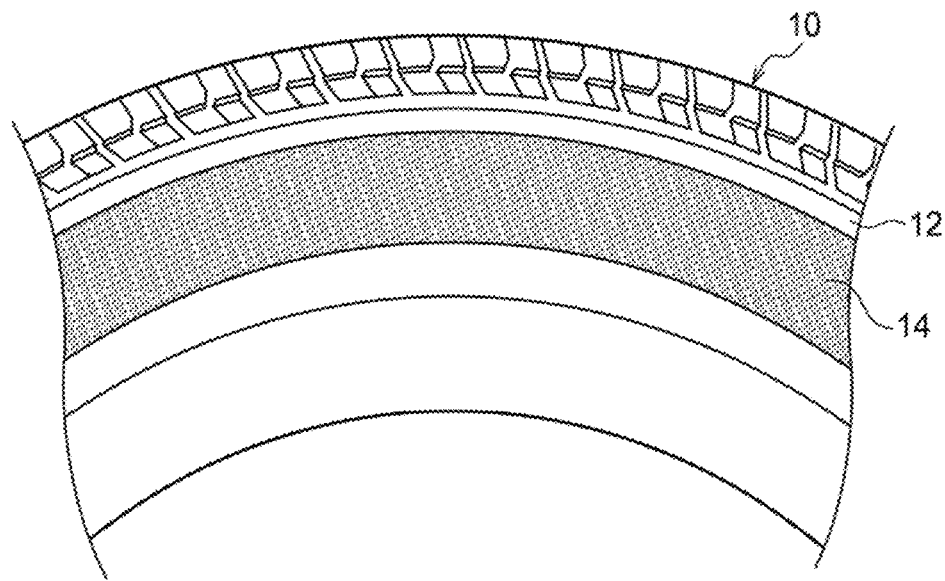
FIG. 1 is plan view (a front view of a tire) showing a portion of a tire side portion of a tire at which a decorative body relating to an embodiment in the present invention is formed.

As shown in FIG. 1, a decorative body 14 that is annular is provided at a tire side portion 12 of the tire 10.

Figure 2:
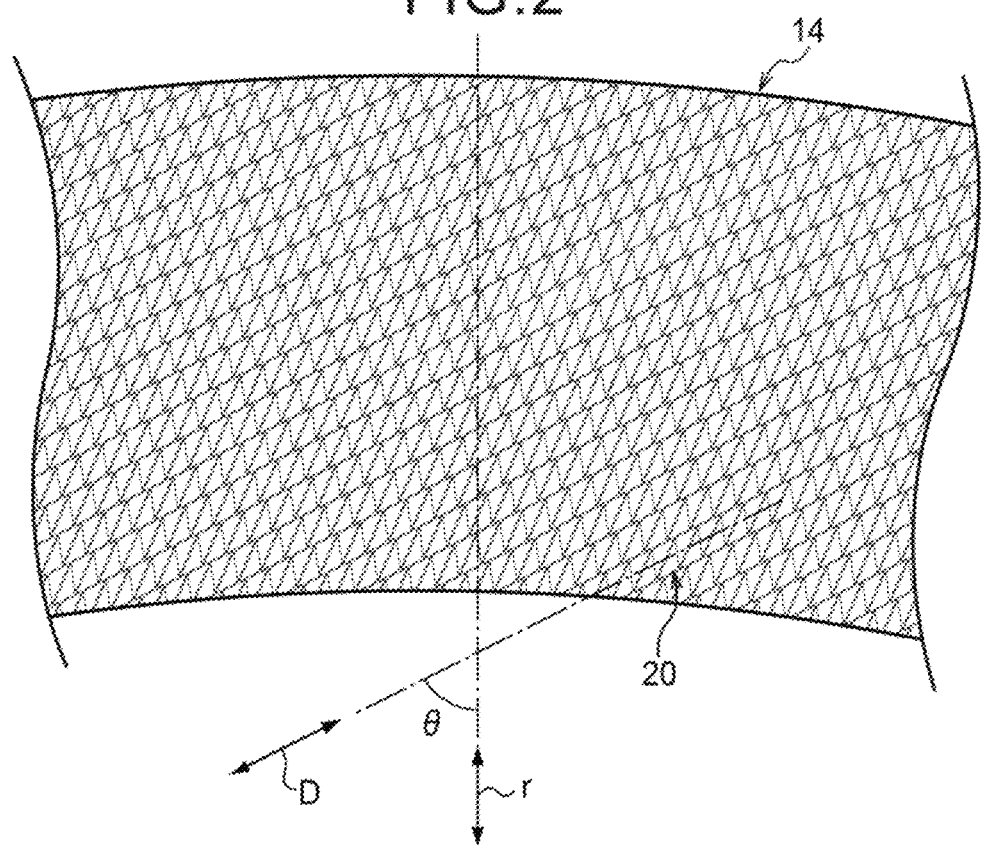
FIG. 2 is plan view in which a decorative portion that is shown in FIG. 1 is enlarged.
Figure 3:
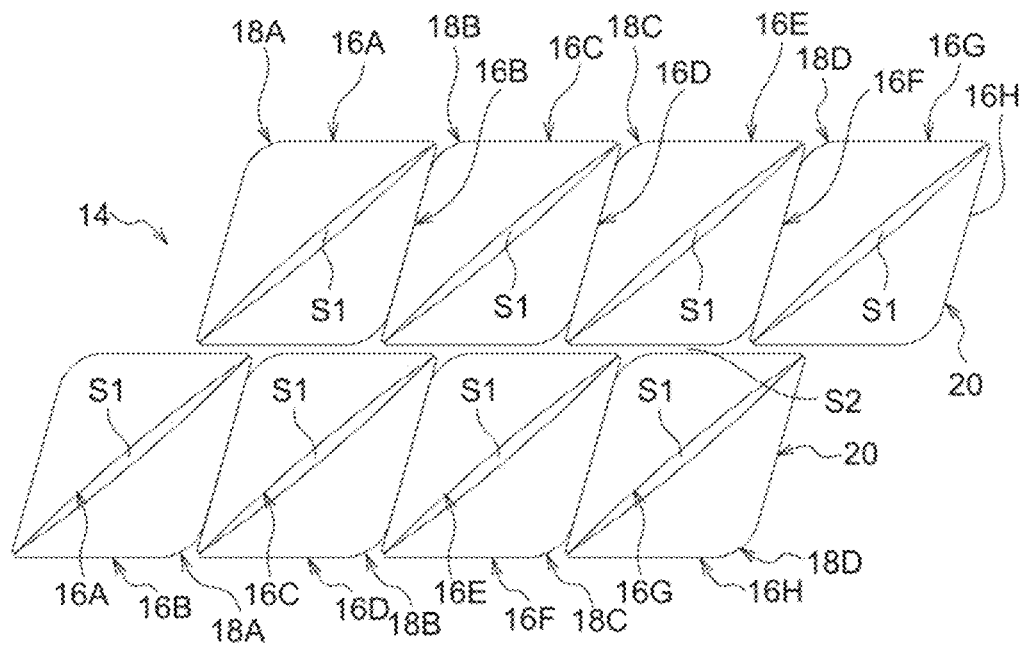
FIG. 3 is plan view showing reflecting cells.
Figure 4:
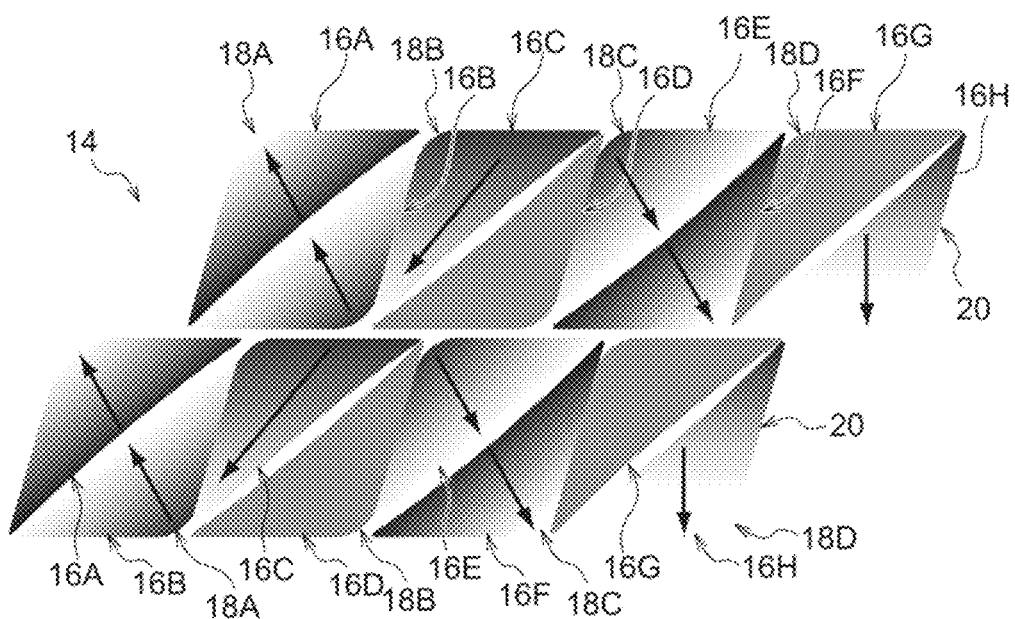
FIG. 4 is plan view of the reflecting cells in which the heights of inclined surfaces of reflecting pieces are expressed by gradation.

As shown in FIG. 2 and FIG. 3, the decorative body 14 is structured by reflecting pieces 16 that are examples of eight types of solid shapes that appear to be substantially triangular when the tire side portion 12 is seen in plan view and, more specifically, reflecting pieces 16A through 16H that have the shapes that are described hereinafter.

As shown in FIG. 3, in the present embodiment, a first set 18A, a second set 18B, a third set 18C and a fourth set 18D, which serve as examples of third solid shaped pairs having substantially rhomboid outer shapes, are structured by combining any two of the reflecting pieces 16A through 16H such that the longest sides thereof face one another. At a reflecting cell 20 of the present embodiment, the first set 18A is structured by the reflecting piece 16A and the reflecting piece 16B being combined in a substantially rhomboid shape, and the second set 18B is structured by the reflecting piece 16C and the reflecting piece 16D being combined in a substantially rhomboid shape, and the third set 18C is structured by the reflecting piece 16E and the reflecting piece 16F being combined in a substantially rhomboid shape, and the fourth set 18D is structured by the reflecting piece 16G and the reflecting piece 16H being combined in a substantially rhomboid shape. Further, the reflecting cell 20, which has an outer shape that is a long and thin substantial parallelogram, is structured due to the first set 18A, the second set 18B, the third set 18C and the fourth set 18D being lined-up in order along one direction (in FIG. 3, the left-right direction in the drawing).

As shown in FIG. 2, the decorative body 14 of the present embodiment is structured by the reflecting cells 20, which are structured as described above, being spread over the length direction and the short side direction (the direction orthogonal to the length direction) of the reflecting cells 20. As shown in FIG. 3, the one reflecting cell 20 and the another reflecting cell 20 that are adjacent in the short-side direction are disposed so as to be offset slightly in the length direction of the reflecting cells 20.

As shown in FIG. 2, the reflecting cells 20 are disposed such that, when the tire side portion 12 is seen in plan view, length direction D (the direction of the arrow) of the reflecting cells 20 is inclined 65° (angle θ in FIG. 2) with respect to radial direction r (the direction of the arrow) of the decorative body 14 that is annular.

(Reflecting Piece 16A)

Figure 5:
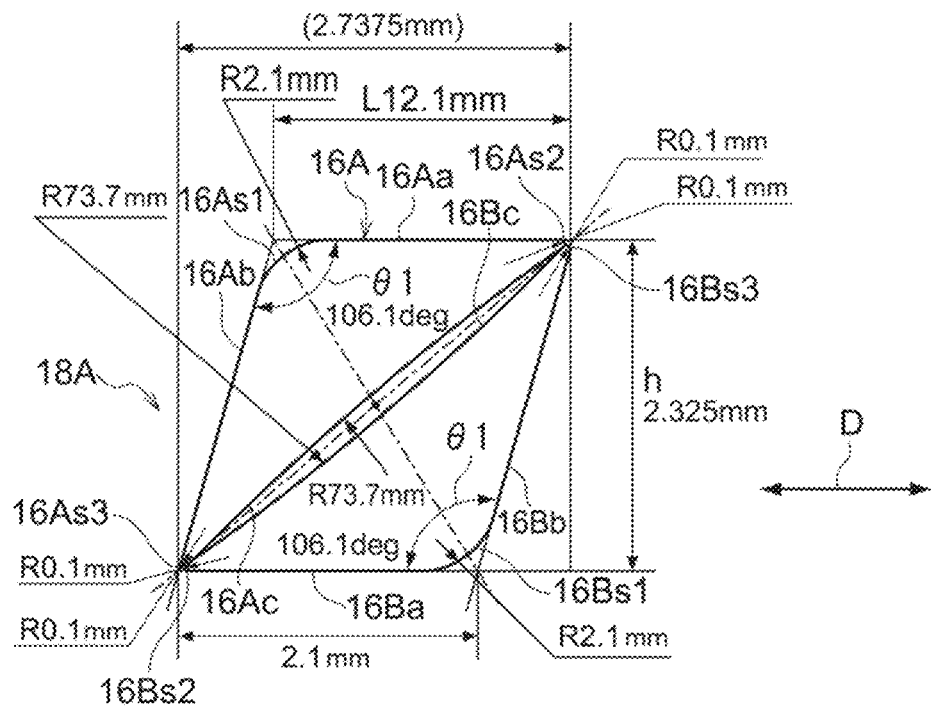
FIG. 5 is plan view showing dimensions of a first set that is formed from a pair of the reflecting pieces.
Figure 6:
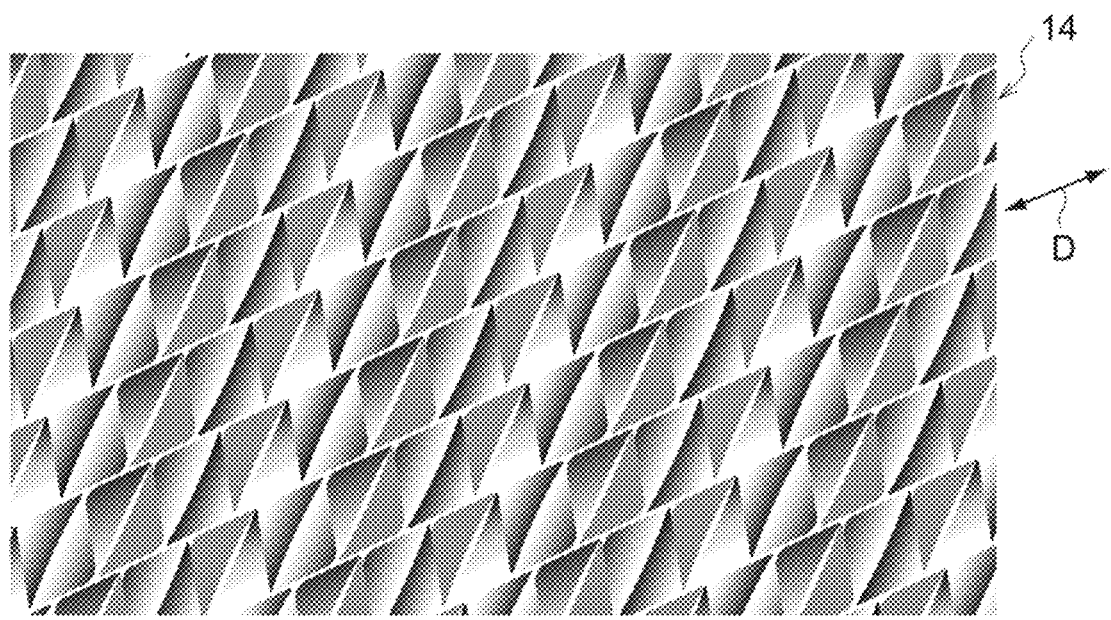
FIG. 6 is an enlarged plan view of a decorative portion in which the heights of the inclined surfaces of the reflecting pieces are expressed by gradation.

As shown in plan view in FIG. 5, the reflecting piece 16A has a first side 16Aa that is parallel to the length direction D of the reflecting cell 20, a second side 16Ab that is inclined at a relatively large angle with respect to the length direction D of the reflecting cell 20, and a third side 16Ac that is the longest and that is inclined at a relatively small angle with respect to the length direction D of the reflecting cell 20. Note that the first side 16Aa and the second side 16Ab are rectilinear as seen in plan view, but the third side 16Ac is curved at a radius of curvature R of, as an example, 73.7 mm so as to be convex toward the inner side of the triangular shape. Further, in the present embodiment, angle θ1 that is formed by the first side 16Aa and the second side 16Ab is 106.1° (deg) as seen in plan view.

At the reflecting piece 16A, length L1 of the first side 16Aa is 2.1 mm, and dimension h in the direction orthogonal to the first side 16Aa is 2.325 mm.

Further, connecting portion 16As1 of the first side 16Aa and the second side 16Ab is formed in an arc shape of a radius of curvature R of 2.1 mm as an example. Moreover, connecting portion 16As2 of the first side 16Aa and the third side 16Ac, and connecting portion 16As3 of the second side 16Ab and the third side 16Ac, are formed in arc shapes of radii of curvature R of 0.1 mm as seen in plan view as an example.

Figure 7:
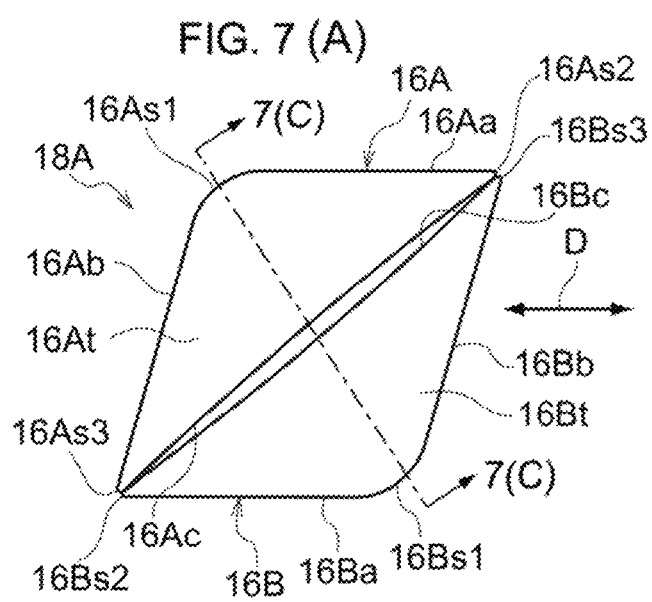
FIG. 7(A) is plan view showing the first set.
FIG. 7(B) is plan view showing the first set in which the heights of the inclined surfaces of the reflecting pieces are expressed by gradation.
FIG. 7(C) is a vertical sectional view of the first set.
FIG. 7(D) is a drawing showing the relationship between density and height dimension.
Figure 7:
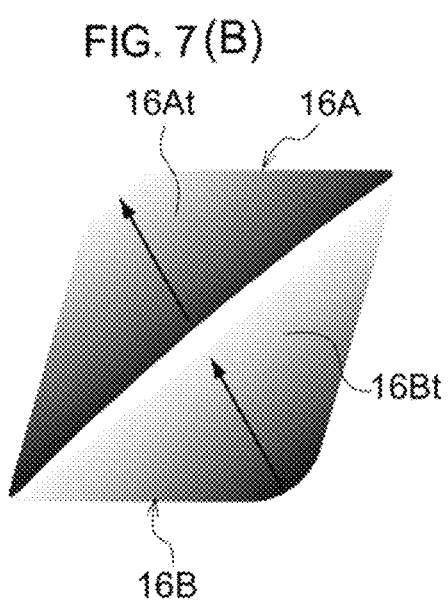
Figure 7:
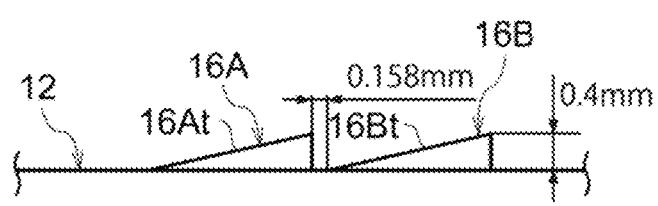
Figure 7:
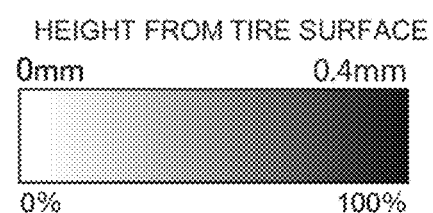

As shown in FIG. 7, the reflecting piece 16A on the whole is a triangular pillar shape of a low height that projects-out from the base portion of the tire side portion 12. At the reflecting piece 16A, the third side 16Ac is the highest, and the height thereof is constant at 0.4 mm on the whole. Further, at the top surface (hereinafter also called inclined surface 16At) of the reflecting piece 16A, the height gradually decreases at a constant angle of inclination from the third side 16Ac toward the connecting portion 16As1 of the first side 16Aa and the second side 16Ab. Namely, the inclined surface 16At is at the lowest height at the connecting portion 16As1 (as an example, a height of 0 mm). Note that the inclined surface 16At is a flat surface.

Note that the arrow in FIG. 7(B) indicates the direction of inclination (the downward direction) of the inclined surface 16At of the reflecting piece 16A. Further, the portion where the density is high shows the portion where the height is high, and the portion where the density is low shows the portion where the height is low (refer to FIG. 7(D)).

(Reflecting Piece 16B)

As shown in FIG. 7, the reflecting piece 16B has a first side 16Ba that is parallel to the length direction D of the reflecting cell 20, a second side 16Bb that is inclined at a relatively large angle with respect to the length direction D of the reflecting cell 20, and a third side 16Bc that is the longest and that is inclined at a relatively small angle with respect to the length direction D of the reflecting cell 20. As shown in FIG. 5, the first side 16Ba and the second side 16Bb of the reflecting piece 16B are rectilinear as seen in plan view, but the third side 16Bc is curved at a radius of curvature R of, as an example, 73.7 mm so as to be convex toward the inner side of the triangular shape. Further, in the present embodiment, angle θ1 that is formed by the first side 16Ba and the second side 16Bb is 106.1° (deg) as seen in plan view.

Connecting portion 16Bs1 of the first side 16Ba and the second side 16Bb is formed in an arc shape of a radius of curvature R of 2.1 mm as seen in plan view, as an example. Moreover, connecting portion 16Bs2 of the first side 16Ba and the third side 16Bc, and connecting portion 16Bs3 of the second side 16Bb and the third side 16Bc, are formed in arc shapes of radii of curvature R of 0.1 mm as seen in plan view, as an example. In this way, the shape, as seen in plan view, of the reflecting piece 16B is a shape that has point symmetry with respect to the reflecting piece 16A, with the center of the symmetry being the central point of the first set 18A that is substantially rhomboid as seen in plan view.

As shown in FIG. 7, the reflecting piece 16B on the whole is a triangular pillar shape of a low height that projects-out from the base portion of the tire side portion 12. At the top surface (hereinafter also called inclined surface 16Bt) of the reflecting piece 16B, the connecting portion 16Bs1 of the first side 16Ba and the second side 16Bb is the highest (as an example, a height of 0.4 mm), and the top surface is inclined downward from the connecting portion 16Bs1 toward the third side 16Bc, and the third side 16Bc on the whole is the lowest height at the reflecting piece 16B (as an example, a constant height of 0 mm). Note that the inclined surface 16Bt is a flat surface.

Note that the arrow in FIG. 7(B) indicates the direction of inclination (the downward direction) of the inclined surface 16Bt of the reflecting piece 16B. Further, the portion where the density is high shows the portion where the height is high, and the portion where the density is low shows the portion where the height is low.

(Reflecting Piece 16C)

As shown in FIG. 8, the shape, as seen in plan view, of the reflecting piece 16C is the same shape as the reflecting piece 16A (a triangular shape).

The reflecting piece 16C on the whole is a triangular pillar shape of a low height that projects-out from the base portion of the tire side portion 12. At the reflecting piece 16C, a first side 16Ca is the highest (as an example, a height of 0.4 mm), and the reflecting piece 16C is inclined downward from the first side 16Ca toward a connecting portion 16Cs3 of a second side 16Cb and a third side 16Cc, and the connecting portion 16Cs3 is the lowest height of the reflecting piece 16C (as an example, a height of 0 mm). Namely, at the reflecting piece 16C, an inclined surface 16Ct, which is inclined downward from the first side 16Ca toward the connecting portion 16Cs3 of the second side 16Cb and the third side 16Cc, is the lowest height at the connecting portion 16Cs3 (as an example, a height of 0 mm). Note that the inclined surface 16Ct is a flat surface.

Note that the arrow in FIG. 8(C) indicates the direction of inclination (the downward direction) of the inclined surface 16Ct of the reflecting piece 16C. Further, the portion where the density is high shows the portion where the height is high, and the portion where the density is low shows the portion where the height is low.

(Reflecting Piece 16D)

As shown in FIG. 8, the shape, as seen in plan view, of the reflecting piece 16D is the same shape as the reflecting piece 16B (a triangular shape).

The reflecting piece 16D on the whole is a triangular pillar shape of a low height that projects-out at a constant height (as an example, 0.2 mm) from the base portion of the tire side portion 12. Note that an inclined surface 16Dt of the reflecting piece 16D is a flat surface that is parallel to the bottom surface.

(Reflecting Piece 16E)

Figure 9A:
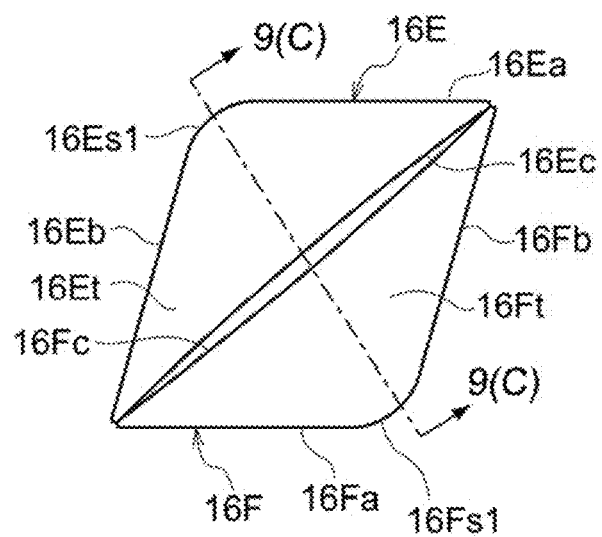
FIG. 9(A) is plan view showing a third set.
Figure 9B:
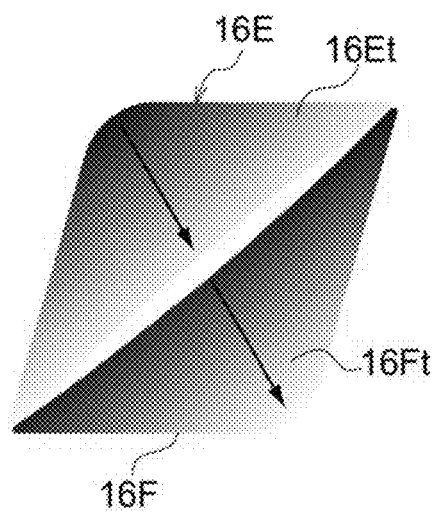
FIG. 9(B) is plan view showing the third set in which the heights of the inclined surfaces of the reflecting pieces are expressed by gradation.
Figure 9C:
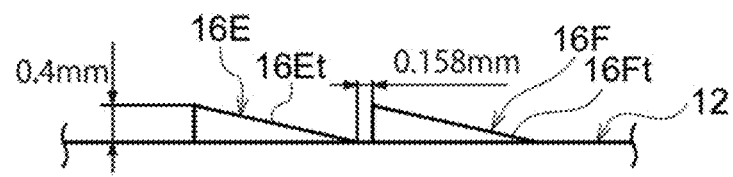
FIG. 9(C) is a vertical sectional view of the third set.

As shown in FIG. 9, the shape, as seen in plan view, of the reflecting piece 16E is the same shape as the reflecting piece 16A (a triangular shape).

The reflecting piece 16E on the whole is a triangular pillar shape of a low height that projects-out from the base portion of the tire side portion 12. At the reflecting piece 16E, a connecting portion 16Es1 of a first side 16Ea and a second side 16Eb is the highest (as an example, a height of 0.4 mm), and the reflecting piece 16E is inclined downward toward a third side 16Ec, and the third side 16Ec is the lowest height of the reflecting piece 16E (as an example, a constant height of 0 mm). Namely, at the reflecting piece 16E, an inclined surface 16Et, which is inclined downward from the connecting portion 16Es1 of the first side 16Ea and the second side 16Eb toward the third side 16Ec, is the lowest height at the third side 16Ec. Note that the inclined surface 16Et is a flat surface.

Note that the arrow in FIG. 9(B) indicates the direction of inclination (the downward direction) of the inclined surface 16Et of the reflecting piece 16E. Further, the portion where the density is high shows the portion where the height is high, and the portion where the density is low shows the portion where the height is low.

(Reflecting Piece 16F)

As shown in FIG. 9, the shape, as seen in plan view, of the reflecting piece 16F is the same shape as the reflecting piece 16B (a triangular shape).

As shown in FIG. 9, the reflecting piece 16F on the whole is a triangular pillar shape of a low height that projects-out from the base portion of the tire side portion 12. At the reflecting piece 16F, a third side 16Fc is the highest (as an example, a height of 0.4 mm), and the reflecting piece 16F is inclined downward toward a connecting portion 16Fs1 of a first side 16Fa and a second side 16Fb, and the connecting portion 16Fs1 is the lowest height of the reflecting piece 16F (as an example, a height of 0 mm). Namely, at the reflecting piece 16F, an inclined surface 16Ft, which is inclined downward from the third side 16Fc toward the connecting portion 16Fs1 of the first side 16Fa and the second side 16Fb, is the lowest height at the connecting portion 16Fs1. Note that the inclined surface 16Ft is a flat surface.

Note that the arrow in FIG. 9(B) indicates the direction of inclination (the downward direction) of the inclined surface 16Ft of the reflecting piece 16F. Further, the portion where the density is high shows the portion where the height is high, and the portion where the density is low shows the portion where the height is low.

(Reflecting Piece 16G)

As shown in FIG. 10, the shape, as seen in plan view, of the reflecting piece 16G is the same shape as the reflecting piece 16A (a triangular shape).

The reflecting piece 16G on the whole is a triangular pillar shape of a low height that projects-out from the base portion of the tire side portion 12 at a constant height (e.g., 0.2 mm). Note that a top surface 16Gt of the reflecting piece 16G is a flat surface that is parallel to the bottom surface.

(Reflecting Piece 16H)

As shown in FIG. 10, the shape, as seen in plan view, of the reflecting piece 16H is the same shape as the reflecting piece 16B (a triangular shape).

As shown in FIG. 10, the reflecting piece 16H on the whole is a triangular pillar shape of a low height that projects-out from the base portion of the tire side portion 12.

At the reflecting piece 16H, a connecting portion 16Hs3 of a second side 16Hb and a third side 16Hc is the highest (as an example, a height of 0.4 mm), and the reflecting piece 16H is inclined downward toward a first side 16Ha, and the first side 16Ha is the lowest height of the reflecting piece 16B (as an example, a constant height of 0 mm). Namely, at the reflecting piece 16H, an inclined surface 16Ht, which is inclined downward from the connecting portion 16Hs3 of the second side 16Hb and the third side 16Hc toward the first side 16Ha, is the lowest height at the first side 16Ha. Note that the inclined surface 16Ht is a flat surface.

Figure 10A:
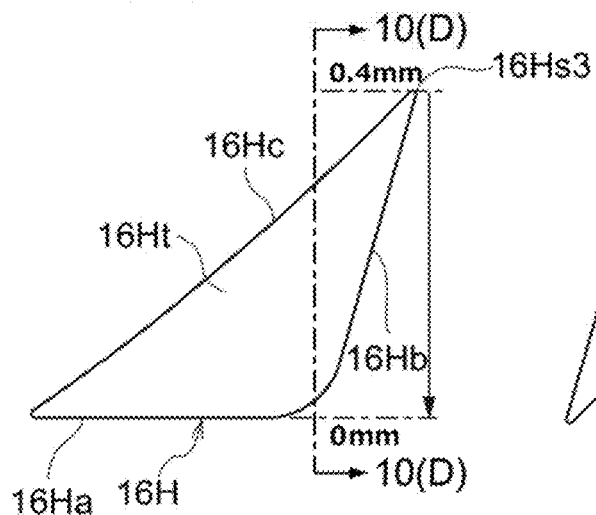
FIG. 10(A) is plan view showing one reflecting piece of a fourth set.
Figure 10B:
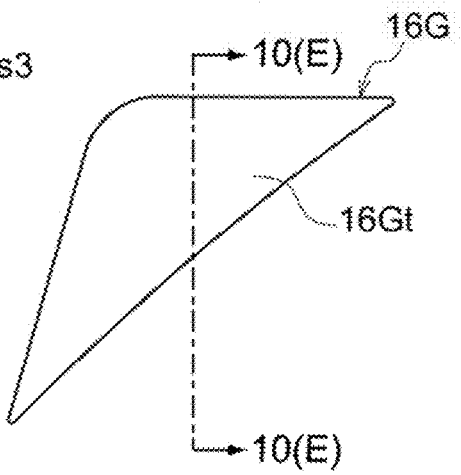
FIG. 10(B) is plan view showing another reflecting piece of the fourth set.
Figure 10C:
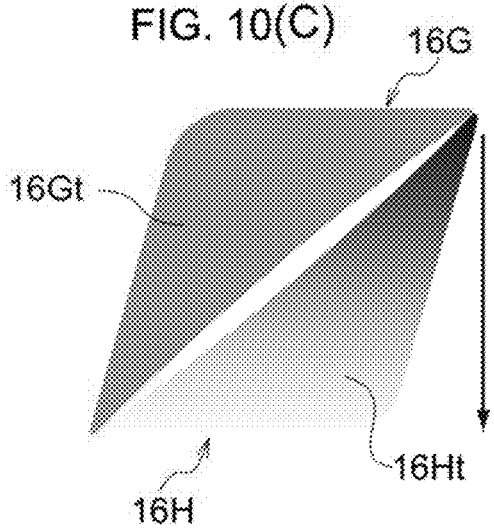
FIG. 10(C) is plan view showing the fourth set in which the heights of the inclined surfaces of the reflecting pieces are expressed by gradation.
Figure 10D:
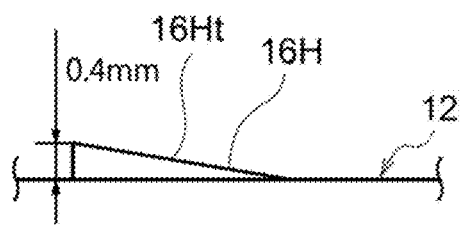
FIG. 10(D) is a cross-sectional view of the one reflecting piece of the fourth set.
Figure 10E:
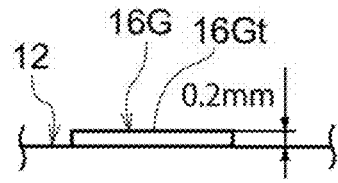
FIG. 10(E) is a cross-sectional view of the another reflecting piece of the fourth set.

Note that the arrow in FIG. 10(C) indicates the direction of inclination (the downward direction) of the inclined surface 16Ht of the reflecting piece 16H. Further, the portion where the density is high shows the portion where the height is high, and the portion where the density is low shows the portion where the height is low.

As shown in FIG. 3, gaps S1, which are long and thin and extend in the diagonal directions of the rhombuses and are formed between the reflecting piece 16A and the reflecting piece 16B, between the reflecting piece 16C and the reflecting piece 16D, between the reflecting piece 16E and the reflecting piece 16F, and between the reflecting piece 16G and the reflecting piece 16H, are the base portion of the tire side portion 12.

Further, a gap S2 of a uniform width (as an example, 0.1 mm) is formed between one of the reflecting cells 20 and another of the reflecting cells 20 that are disposed in the short side direction of the reflecting cells 20. This gap S2 also is the base portion of the tire side portion 12.

Note that the respective top surfaces (inclined surfaces) of the reflecting pieces 16 of the decorative body 14 are preferably more smooth than the tire side portion 12 so that light can be reflected regularly, or, in other words, so that it is difficult for the light to be reflected irregularly. The surface roughness thereof is preferably made to be 1 to 15 Rz (Rt).

Moreover, the angles of inclination, with respect to the surface of the tire side portion 12 (the bottom surfaces of the reflecting pieces), of the inclined surface 16At of the reflecting piece 16A, the inclined surface 16Bt of the reflecting piece 16B, the inclined surface 16Ct of the reflecting piece 16C, the inclined surface 16Et of the reflecting piece 16E, the inclined surface 16Ft of the reflecting piece 16F, and the inclined surface 16Ht of the reflecting piece 16H are preferably within the range of 5 to 60°, and more preferably within the range of 5 to 45°, and even more preferably within the range of 5 to 30°.

(Operation, Effects)

When light (e.g., external light such as sunlight or the like) is illuminated onto the decorative body 14, the respective top surfaces of the respective reflecting pieces reflect the light. The respective top surfaces of the respective reflecting pieces that structure the decorative body 14 face in various directions (see FIG. 6), and moreover, the tire side portion 12 at which the decorative body 14 is formed is a curved surface. Therefore, for example, in a case in which the tire 10 is observed by an observer who is standing head-on in front of or obliquely in front of the tire 10, the top surfaces that reflect the light toward the observer disperse the light at various positions within the decorative body 14. Further, when the observer and the decorative body 14 of the tire 10 move relatively, such as the tire 10 rotates or the observer moves in a state in which the tire 10 is stationary, the top surfaces that reflect the light toward the observer change together with the relative movement. Therefore, when an observer looks at the decorative body 14, the positions of the portions that appear to be shining (the inclined surfaces and the top surfaces) change randomly, and a flickering feeling is obtained, and the decorative body 14 appears to have a sparkling appearance.

Due thereto, the decorative body 14 can improve the visibility of the tire 10 of the present embodiment, and can present a high-class feel due to the texture effect.

In the present embodiment, the reflecting cells 20 are structured by the eight types of reflecting pieces 16A through 16H, and the decorative body 14 is structured by spreading these reflecting cells 20 over the length direction and the short-side direction. Therefore, the design of the mold that molds the tire, and the machining thereof, are easy as compared with a case in which the vectors of the inclined surfaces of all of the reflecting pieces that structure the decorative body 14 are made to differ respectively.

By making the angles of inclination, with respect to the surface of the tire side portion 12 (the bottom surfaces of the reflecting pieces), of the inclined surface 16At of the reflecting piece 16A, the inclined surface 16Bt of the reflecting piece 16B, the inclined surface 16Ct of the reflecting piece 16C, the inclined surface 16Et of the reflecting piece 16E, the inclined surface 16Ft of the reflecting piece 16F, and the inclined surface 16Ht of the reflecting piece 16H be within the range of 5 to 60°, the decorative body 14 can improve the visibility of the tire 10 of the present embodiment, and can present a high-class feel due to the texture effect.

Note that, if the aforementioned angles of inclination are less than 5° the angles of inclination of the respective inclined surfaces are too small and come close to being parallel to the surface of the tire side portion 12, and therefore, the reflecting of the light in order to improve the sparkling sensation is insufficient. On the other hand, if the aforementioned angles of inclination exceed 60°, the angles of inclination of the respective inclined surfaces are too large, and the surface areas of the respective inclined surfaces at the time when the tire side portion 12 is seen in plan view decrease, and it is difficult to improve the sparkling sensation.

Although the tire 10 relating to an embodiment in the present invention has been described above, the present invention is not limited to the above, and, other than the above, can of course be implemented by being modified in various ways within a scope that does not depart from the gist thereof.

In the above-described embodiment, the maximum height of the reflecting pieces 16A, 16B, 16C. 16E, 16F, 16H is 0.4 mm, but the maximum height is not limited to 0.4 mm. Further, although the heights of the reflecting pieces 16D, 16G are 0.2 mm, the heights are not limited to 0.2 mm. Note that it is preferable that the reflecting pieces 16A through 16H project-out by 0.1 to 1.5 mm from the base portion of the tire side portion 12.

In the above-described embodiment, the reflecting pieces 16 that structure the decorative body 14 are shaped as triangular pillars, but the present disclosure is not limited to this. For example, the decorative body 14 may be structured by reflecting pieces 22 that are shaped as quadrangular pillars whose shapes as seen in plan view are quadrangular as shown in FIG. 11(A), and at which the directions of the vectors of inclined surfaces 22t are different as shown in FIG. 11(B) through (D). Or, the decorative body 14 may be structured by reflecting pieces 24 that are shaped as cylinders whose shapes as seen in plan view are circular as shown in FIG. 12, and at which the directions of the vectors of inclined surfaces 24 are different as shown in FIG. 12(B) through (D). Or, the decorative body 14 may be structured by reflecting pieces 26 that are shaped as pentagonal pillars whose shapes as seen in plan view are pentagonal as shown in FIG. 13, and at which the directions of the vectors of inclined surfaces 26t are different as shown in FIG. 13(B) through (D). Or, the decorative body 14 may be structured by reflecting pieces 28 that are shaped as hexagonal pillars whose shapes as seen in plan view are hexagonal as shown in FIG. 14, and at which the directions of the vectors of inclined surfaces 28t are different as shown in FIG. 14(B) through (D). Various shapes other than these can be employed as the shapes of the reflecting pieces as seen in plan view. Further, the decorative body 14 may be structured by combining reflecting pieces that have different bottom surface shapes.

An overview of the present embodiment is described hereinafter on the basis of reference drawings.

Figure 15A:
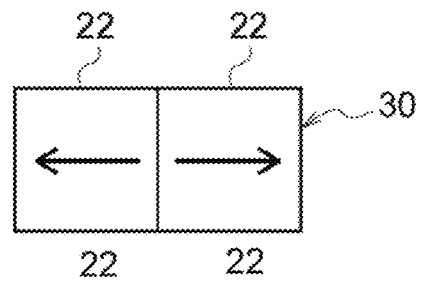
FIG. 15(A) is plan view showing a set of reflecting cells in which the initial points of vectors are adjacent and the orientations of the vectors are opposite directions.
Figure 15B:
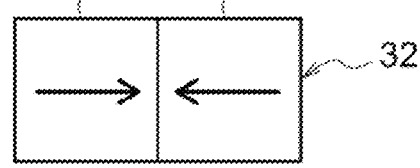
FIG. 15(B) is plan view showing a set of reflecting cells in which the terminal points of vectors are adjacent and the orientations of the vectors are opposite directions.
Figure 15C:
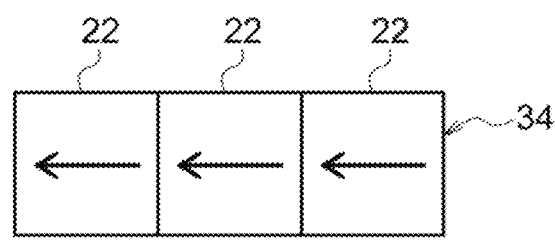
FIG. 15(C) is plan view showing a case in which three reflecting cells in which the orientations of the vectors are the same direction (a lateral direction) are continuous.
Figure 15D:
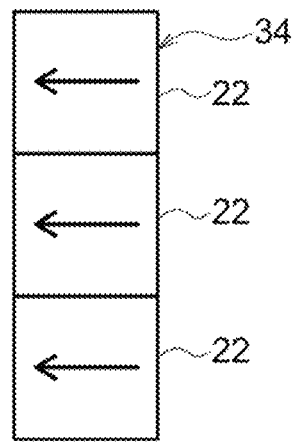
FIG. 15(D) is plan view showing a case in which three reflecting cells in which the orientations of vectors are the same direction (a vertical direction) are continuous.
Figure 15E:
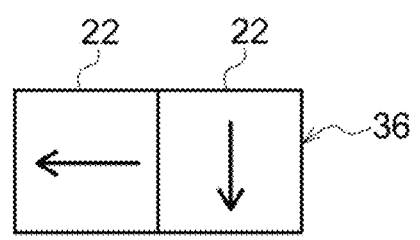
FIG. 15(E) is plan view showing a set of reflecting cells in which the orientations of the vectors are different directions.
Figure 15F:
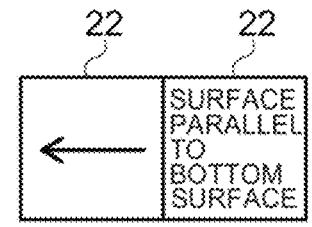
FIG. 15(F) is plan view showing a set of a reflecting cell that has a vector and a reflecting cell that does not have a vector (the top surface is parallel to the bottom surface).

As an example, given that as shown in FIG. 15(A), a pair of the reflecting pieces 22 at which the initial point of the vector (the arrow) of one of the reflecting pieces 22 that are adjacent to one another and the initial point of the vector of the another reflecting piece 22 are adjacent to one another, and the vector of the one reflecting piece 22 and the vector of the another reflecting piece 22 face in directions opposite one another, is defined as a first solid shape pair 30, as shown in FIG. 15(B), a pair of the reflecting pieces 22 at which the terminal point of the vector of one of the reflecting pieces 16 that are adjacent to one another and the terminal point of the vector of the another reflecting piece 22 are adjacent to one another, and the vector of the one reflecting piece 22 and the vector of the another reflecting piece 22 face in directions opposite one another, is defined as a second solid shape pair 32, as shown in FIGS. 15(C) and 15(D), an aggregate of the reflecting pieces 22, at which three or more of the reflecting pieces 22 at which the orientations of the vectors face in the same direction are continuous, is defined as a first solid shape group 34, and as shown in FIGS. 15(E) and 15(F), a pair formed from two of the reflecting pieces 22 that do not belong to any of the first solid shape pair 30, the second solid shape pair 32 and the first solid shape group 34, is defined as a third solid shape pair 36, it suffices for the decorative body 14 to, when the tire side portion 12 is seen in plan view, satisfy all conditions that are a first condition that satisfies total surface area of the third solid shape pair 36>total surface area of the first solid shape pair 30, a second condition that satisfies total surface area of the third solid shape pair 36>total surface area of the second solid shape pair 32, and a third condition that satisfies total surface area of the third solid shape pair 36>total surface area of the first solid shape group 34. In other words, if the above-described conditions are satisfied, a few of the first solid shape pairs 30, the second solid shape pairs 32 and the first solid shape group 34 may be included in the decorative body 14. Note that, in order to emphasize the sparkling sensation, it is preferable that the decorative body 14 satisfy total surface area of the third solid shape pair 36>total surface area of the first solid shape pair 30+total surface area of the second solid shape pair 32+total surface area of the first solid shape group 34.

Here, because the first solid shape pair 30, the second solid shape pair 32 and the first solid shape group 34 are structures by which it is difficult to obtain a sparkling sensation, they do not have to be included in the decorative body 14. The above-described third solid shape pair 30 corresponds to the first set 18A, the second set 18B, the third set 18C and the fourth set 18D at the decorative body 14 of the above-described embodiment. Structures corresponding to the above-described first solid shape pair 30, second solid shape pair 32 and first solid shape group 34 are not provided at the decorative body 14 of the above-described embodiment.

Figure 16:
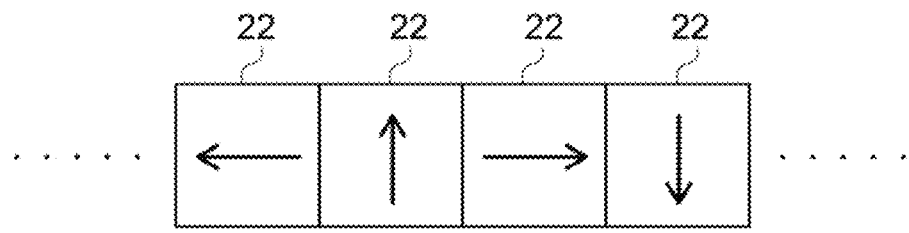
FIG. 16 is plan view of reflecting cells showing a case in which four reflecting cells, in which the rotating directions of the vectors are the same rotating direction and the rotation angle is the same, are continuous.

Moreover, at the decorative body 14, it is preferable to exclude a structure in which, as shown in FIG. 16 as an example, when looking at three of the reflecting pieces 22 that are disposed in continuation from one side to another side when the tire side portion 12 is seen in plan view, the orientations of the rotating directions of the vectors, having a reference that is a normal line that is normal to the surface of the tire side portion 12, change by the same angle (in FIG. 16, 90° as an example) in the same rotating direction from the one side to the other side. If three reflecting pieces, at which the rotating directions of the vectors are the same rotating direction and the same angle, are continuous, it will feel as if there is regularity in the array of the inclined surfaces, and the random sensation in the array of the inclined surfaces that reflect light will be insufficient.

It is preferable that the proportion of the surface area, which is occupied by the inclined surfaces that have the smallest angles of inclination, per unit surface area of the decorative body 14 be in the range of 70 to 100%. The sparkling sensation can be emphasized thereby. Further, it is preferable for 3 to 200 of the reflecting pieces 16 to be provided per 1 cm$^2$, and providing 10 to 100 is more preferable. The sparkling sensation can be emphasized thereby.

Next, supplementary description is given of the top surfaces, which reflect light, of the reflecting pieces.

Figure 17:
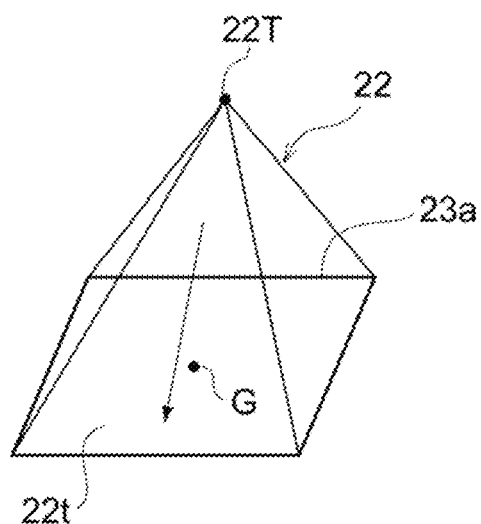
FIG. 17 is a perspective view explaining a top surface (an inclined surface) of a reflecting cell.

In the present embodiment, in order to obtain the sparkling sensation, the surface that reflects light with respect to the observer is the inclined surface, having the angle of inclination with respect to the bottom surface of the reflecting piece which is the smallest, of the reflecting piece that is an example of the solid shape. As shown in FIG. 17, when considering the reflecting piece 22 whose bottom surface is quadrangular, highest portion (vertex) 22T of the reflecting piece 22 being positioned above a region that is further toward an outer peripheral side of the bottom surface of the reflecting piece 22 than center of gravity G of the bottom surface of the reflecting piece 22 that is seen in plan view, is a condition that is preferable in terms of making large the surface area of the inclined surfaces that reflect light. Note that, although not illustrated, in a case in which the highest portion is a side, the length direction central portion of that side is the vertex 22T. At the reflecting piece 22 shown in FIG. 17, the highest portion 22T is positioned at a portion that is near a side 23a of the bottom surface, and, due thereto, of the plural surfaces of the reflecting piece 22 other than the bottom surface, a surface that has the greatest surface area can be formed (the inclined surface having the angle of inclination with respect to the bottom surface which is the smallest).

Figure 18:
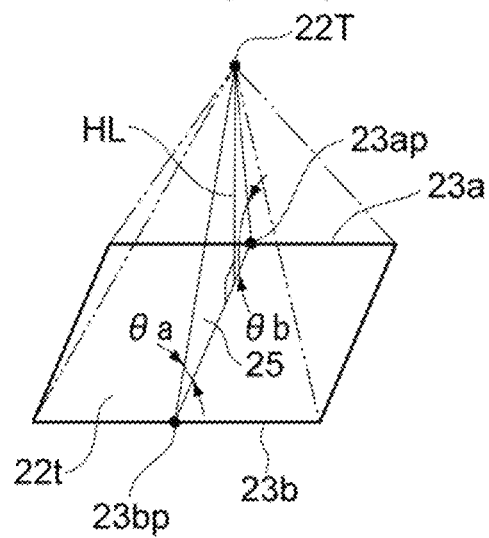
FIG. 18 is a perspective view explaining angles of the inclined surfaces of the reflecting cell.

Moreover, as shown in FIG. 18, when considering an imaginary plane 25 that is triangular, and that includes perpendicular line HL which passes through the highest portion 22T of the reflecting piece 22 and is perpendicular to the bottom surface, and that includes an arbitrary point 23ap of the nearest side 23a to the highest portion 22T among the sides of the bottom surface, and an arbitrary point 23bp of a side 23b that faces the side 23a, given that the angle that is formed by the bottom side of the imaginary plane 25 and one of the inclined sides of the imaginary plane 25 (the side that connects the highest portion 22T and the point 23ap) is θa, and the angle that is formed by the bottom side of the imaginary plane 25 and the other of the inclined sides of the imaginary plane 25 (the side that connects the highest portion 22T and the point 23bp) is θb, it is preferable that Gb be greater than or equal to 85θ and less than or equal to 95°. Due thereto, the surface area of the inclined surface 22t, having the angle of inclination with respect to the bottom surface of the reflecting piece 22 which is set to be smallest, can be made to be large, and the sparkling sensation can be emphasized.

Next, supplementary description will be given of the vector of the top surface, which reflects light, of the reflecting piece.

Figure 19:
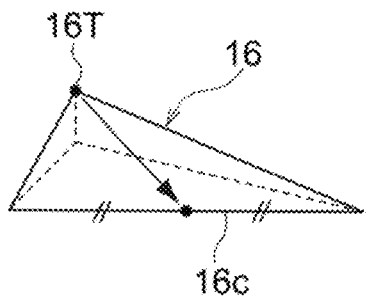
FIG. 19 is a perspective view showing the vector of a reflecting cell that is shaped as a triangular pillar.

At the reflecting piece that is an example of the solid shape, the direction, which heads from the highest region side toward the lowest region side of the inclined surface having the angle of inclination with respect to the bottom surface of the reflecting piece which is the smallest, is defined as the vector of the inclined surface. For example, as shown in FIG. 19, at the reflecting piece 16 that is shaped as a triangular pillar, in a case in which any vertex 16T of the triangle is the highest, and side 16c that faces the vertex 16T is the lowest, the direction heading from the vertex 16T to center point 16cc of the side 16c is the vector (shown by the arrow).

Figure 20:
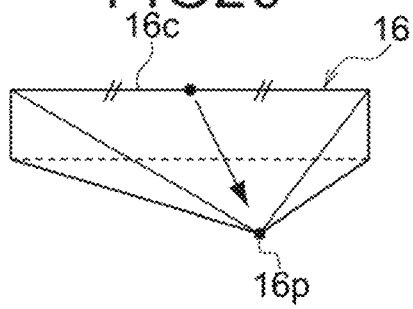
FIG. 20 is a perspective view showing the vector of a reflecting cell that is shaped as another triangular pillar.

Further, as shown in FIG. 20, at the reflecting piece 16 that is shaped as a triangular pillar, in a case in which any side 16*c* of the triangle is the highest (the height thereof is uniform), and vertex 16*p* of the triangle that faces this side 16*c* is the lowest, the direction heading from the central point of the side 16*c* toward the vertex 16*p* is the vector (shown by the arrow).

Figure 21:
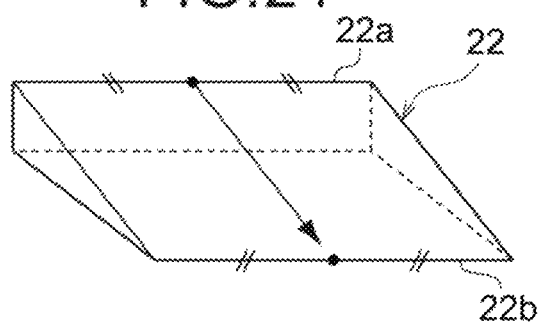
FIG. 21 is a perspective view showing the vector of a reflecting cell that is shaped as a quadrangular pillar.

Further, as shown in FIG. 21, at the reflecting piece 22 that is shaped as a quadrangular pillar, in a case in which any side 22*a* of the quadrangle is the highest (the height thereof is uniform), and a facing side 22*b* is the lowest (the height thereof is uniform), the direction heading from the central point of the side 22*a* toward the central point of the side 22*b* is the vector (shown by the arrow).

Figure 22:
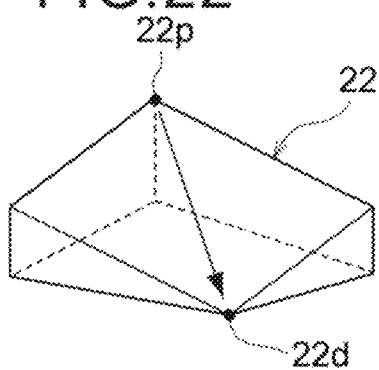
FIG. 22 is a perspective view showing the vector of a reflecting cell that is shaped as another quadrangular pillar.

Further, as shown in FIG. 22, at the reflecting piece 22 that is shaped as a quadrangular pillar, in a case in which any corner portion 22*p* of the quadrangle is the highest, and a facing corner portion 22*d* is the lowest, the direction heading from the one corner portion 22*p* toward the another corner portion 22*d* is the vector (shown by the arrow).

At all of the shapes, at the inclined surface having the angle of inclination with respect to the bottom surface of the reflecting piece which is the smallest, if there is a side whose height is the highest and that is a uniform height, the central point of that side is the initial point of the vector, and, if there is a side whose height is the lowest and that is a uniform height, the central point of that side is the terminal point of the vector. Further, in a case in which the inclined surface is circular, oval or the like, the highest point of the outer peripheral portion of the inclined surface is the initial point of the vector, and the lowest point is the terminal point of the vector.

Figure 23A:
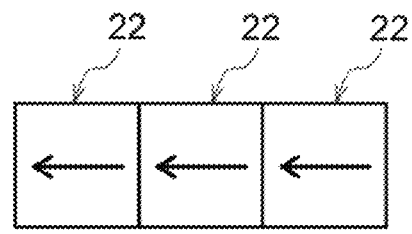
FIGS. 23(A) and 23(B) are plan view and a side view showing three reflecting cells at which the orientations of the vectors are the same as seen in plan view, and the angles of inclination of the inclined surfaces are the same.
Figure 23B:
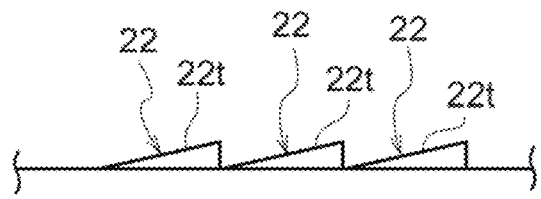
Figure 24A:
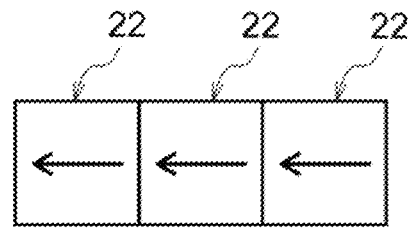
FIGS. 24(A) and 24(B) are plan view and a side view showing three reflecting cells at which the orientations of the vectors are the same as seen in plan view, and the angles of inclination of the inclined surfaces are different.
Figure 24B:
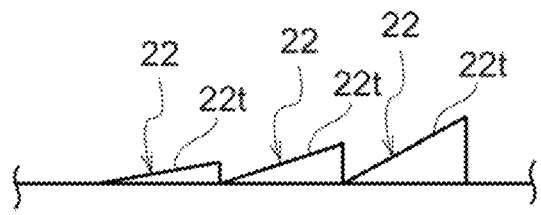

Note that, when comparing a case in which three of the reflecting pieces 22, at which the angles of inclination of the inclined surfaces 22*t* are the same, are continuous as shown in FIG. 23 (corresponding to the first solid shape group of the present disclosure), and a case in which three reflecting pieces 22, at which the angles of inclination of the inclined surfaces 22*t* and the heights are respectively different, are continuous as shown in FIG. 24 (corresponding to the second solid shape group of the present disclosure), the latter is preferable in order to obtain a random sensation of the sparkling. Note that three or more of the reflecting pieces 22, at which the angles of inclination of the inclined surfaces 22*t* and the heights are respectively different, may be continuous.

The disclosure of Japanese Patent Application No. 2017-238077 filed on Dec. 12, 2017 is, in its entirety, incorporated by reference into the present specification.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A decorative body that includes a plurality of solid shapes, in which each solid shape has a bottom surface and an inclined surface that is inclined in a direction other than a plane that is orthogonal to the bottom surface, each of the bottom surfaces being a surface of a tire side portion,
wherein, given that
a direction heading from a highest region side toward a lowest region side of one of the inclined surfaces, having an angle of inclination with respect to the bottom surface which is smallest of the solid shapes, is defined as a vector of the inclined surfaces, and the highest region side of the vector is defined as an initial point of the vector, and the lowest region side of the vector is defined as a terminal point,
a pair of the plurality of solid shapes that are adjacent to one another and at which the initial point of the vector of one solid shape of the pair of solid shapes and the initial point of the vector of another solid shape of the pair of solid shapes are adjacent to one another, and an orientation of the vector of the one solid shape and an orientation of the vector of the other solid shape, when the surface of the tire side portion is seen in plan view, face in directions opposite one another, is defined as a first solid shape pair,
a pair of the solid shapes that are adjacent to one another and at which the terminal point of the vector of one of the solid shapes and the terminal point of the vector of another of the solid shapes are adjacent to one another, and an orientation of the vector of the one solid shape and an orientation of the vector of the another solid shape, when the surface of the tire side portion is seen in plan view, face in directions opposite one another, is defined as a second solid shape pair,
an aggregate of the solid shapes at which three or more of the solid shapes, at which the orientations of the vectors when the surface of the tire side portion is seen in plan view face in the same direction, and at which the orientations of the respective vectors when the solid shapes are seen in a side view face in the same direction, are continuous, is defined as a first solid shape group, a pair formed from two of the solid shapes that do not belong to any of the first solid shape pair, the second solid shape pair and the first solid shape group, is defined as a third solid shape pair, the decorative body includes all of the first solid shape pair, the second solid shape pair, the first solid shape group, and the third solid shape pair, when the surface of the tire side portion is seen in plan view, all conditions including a first condition that satisfies a total surface area of the third solid shape pair>a total surface area of the first solid shape pair, a second condition that satisfies the total surface area of the third solid shape pair>a total surface area of the second solid shape pair, and a third condition that satisfies the total surface area of the third solid shape pair>a total surface area of the first solid shape group, are present.

2. The decorative body of claim 1, wherein the total surface area of the third solid shape pair>the total surface area of the first solid shape pair+the total surface area of the second solid shape pair+the total surface area of the first solid shape group, is satisfied.

3. The decorative body of claim 1, wherein, for the solid shapes that are disposed continuously from one side toward another side when the surface of the tire side portion is seen in plan view, the vector orientations of adjacent inclined surfaces from the one side toward the other side in a same rotating direction of the tire are not changed by the same angle.

4. The decorative body of claim 1, wherein a surface area, which is occupied by the inclined surfaces that have the smallest angles of inclination, per unit surface area of the decorative body when seen in plan view is within a range of 70 to 100%.

5. The decorative body of claim 1, wherein 3 to 200 of the solid shapes are provided per 1 $cm^2$.

6. The decorative body of claim 1, wherein shapes of the inclined surfaces, at which angles of inclination with respect to the bottom surfaces are smallest when the solid shapes are seen in plan view, are triangular.

7. The decorative body of claim 1, comprising a second solid shape group that is an aggregate of the plurality of solid shapes that is structured by three or more of the solid shapes, at which orientations of the vectors when the surface of the tire side portion is seen in plan view face in the same direction, and at which orientations of the respective vectors when the solid shapes are seen in a side view face in different directions, being continuous.

8. The decorative body of claim 1, wherein the total surface area of the third solid shape pair>the total surface area of the first solid shape pair+the total surface area of the second solid shape pair+the total surface area of the first solid shape group, is satisfied, and
the solid shapes are disposed continuously from one side toward another side, the vector orientations of adjacent inclined surfaces from the one side toward the other side in a same rotating direction are not changed by the same angle.

9. The decorative body of claim 1, wherein the total surface area of the third solid shape pair>the total surface area of the first solid shape pair+the total surface area of the second solid shape pair+the total surface area of the first solid shape group, is satisfied, and
a surface area, which is occupied by the inclined surfaces that have the smallest angles of inclination, per unit surface area of the decorative body when seen in plan view is within a range of 70 to 100%.

10. The decorative body of claim 1, wherein the total surface area of the third solid shape pair>the total surface area of the first solid shape pair+the total surface area of the second solid shape pair+the total surface area of the first solid shape group, is satisfied, and
3 to 200 of the solid shapes are provided per 1 cm$^2$.

11. The decorative body of claim 1, wherein the total surface area of the third solid shape pair>the total surface area of the first solid shape pair+the total surface area of the second solid shape pair+the total surface area of the first solid shape group, is satisfied, and
shapes of the inclined surfaces, at which angles of inclination with respect to the bottom surfaces are smallest when the solid shapes are seen in plan view, are triangular.

12. The decorative body of claim 1, wherein the total surface area of the third solid shape pair>the total surface area of the first solid shape pair+the total surface area of the second solid shape pair+the total surface area of the first solid shape group, is satisfied, and
further comprising a second solid shape group that is an aggregate of the plurality of solid shapes that is structured by three or more of the solid shapes, at which orientations of the vectors when the surface of the tire side portion is seen in plan view face in the same direction, and at which orientations of the respective vectors when the solid shapes are seen in a side view face in different directions, being continuous.

13. The decorative body of claim 1, wherein, the solid shapes are disposed continuously from one side toward another side, the vector orientations of adjacent inclined surfaces from the one side toward the other side in a same rotating direction are not changed by the same angle, and
a surface area, which is occupied by the inclined surfaces that have the smallest angles of inclination, per unit surface area of the decorative body when seen in plan view is within a range of 70 to 100%.

14. The decorative body of claim 1, wherein, the solid shapes are disposed continuously from one side toward another side, the vector orientations of adjacent inclined surfaces from the one side toward the other side in a same rotating direction are not changed by the same angle, and
3 to 200 of the solid shapes are provided per 1 cm$^2$.

15. The decorative body of claim 1, wherein, the solid shapes are disposed continuously from one side toward another side, the vector orientations of adjacent inclined surfaces from the one side toward the other side in a same rotating direction are not changed by the same angle, and
shapes of the inclined surfaces, at which angles of inclination with respect to the bottom surfaces are smallest when the solid shapes are seen in plan view, are triangular.

16. The decorative body of claim 1, wherein, the solid shapes are disposed continuously from one side toward another side, the vector orientations of adjacent inclined surfaces from the one side toward the other side in a same rotating direction are not changed by the same angle, and
further comprising a second solid shape group that is an aggregate of the plurality of solid shapes that is structured by three or more of the solid shapes, at which orientations of the vectors when the surface of the tire side portion is seen in plan view face in the same direction, and at which orientations of the respective vectors when the solid shapes are seen in a side view face in different directions, being continuous.

17. The decorative body of claim 1, wherein a surface area, which is occupied by the inclined surfaces that have the smallest angles of inclination, per unit surface area of the decorative body when seen in plan view is within a range of 70 to 100%, and
3 to 200 of the solid shapes are provided per 1 cm$^2$.

18. The decorative body of claim 1, wherein a surface area, which is occupied by the inclined surfaces that have the smallest angles of inclination, per unit surface area of the decorative body when seen in plan view is within a range of 70 to 100%, and
shapes of the inclined surfaces, at which angles of inclination with respect to the bottom surfaces are smallest when the solid shapes are seen in plan view, are triangular.

19. The decorative body of claim 1, wherein a surface area, which is occupied by the inclined surfaces that have the smallest angles of inclination, per unit surface area of the decorative body when seen in plan view is within a range of 70 to 100%, and
further comprising a second solid shape group that is an aggregate of the plurality of solid shapes that is structured by three or more of the solid shapes, at which orientations of the vectors when the surface of the tire side portion is seen in plan view face in the same direction, and at which orientations of the respective vectors when the solid shapes are seen in a side view face in different directions, being continuous.

20. The decorative body of claim 1, wherein 3 to 200 of the solid shapes are provided per 1 cm$^2$, and
shapes of the inclined surfaces, at which angles of inclination with respect to the bottom surfaces are smallest when the solid shapes are seen in plan view, are triangular.

* * * * *